Patented July 14, 1931

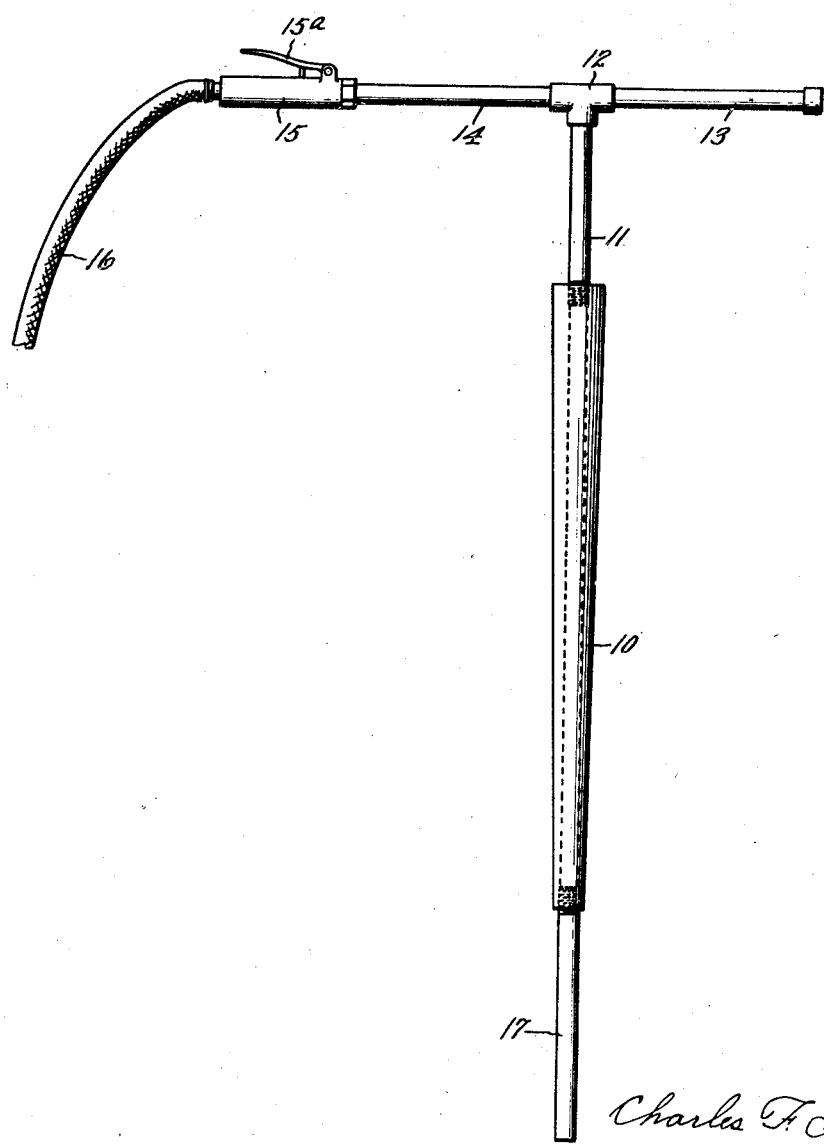

1,814,445

UNITED STATES PATENT OFFICE

CHARLES F. IRISH, OF BRATENAHL, OHIO

SELF TAMPING AERATION TOOL

Application filed December 24, 1928. Serial No. 328,226.

This invention relates to an improved self tamping aeration tool for use in aerating soil about the roots of plants and trees some distance below the surface of the top soil.

It is the object of the invention to provide a self tamping aeration tool for introducing compressed air in the soil about the roots of trees or other plants, to open up cracks or fissures and in general to loosen up the soil beneath the surface without breaking up the top surface of the earth about the trees or other plants and to supply air to the soil about their roots.

A further object is to provide an aeration tool which will seal itself in a hole made for its insertion, and prevent the escape of air, permitting the full force of the compressed air to be expended below the surface of the ground.

With these and other objects in view the invention resides in the arrangement of parts as hereinafter described and illustrated in the accompanying drawing in which the single view is a side elevation of the complete assembly of tool, and handle device.

Describing the invention as illustrated in the drawing by reference characters 10 designates the body of the tool which is in the form of a long tube the exterior of which is gradually tapered. Each end is internally threaded, the larger end to receive the pipe 11 which has its other ends connected in the lateral opening of a T-coupling member 12. In one end of the T-coupler 12 a closed pipe 13 is threaded to provide one handle for the tool. The other end of the coupler 12 has screwed therein a short pipe 14 providing an inlet for compressed air to be used in the tool.

To the outer end of the pipe 14 is secured a handle valve 15 which has one end connected to a hose 16 which leads from a suitable supply of compressed air. The valve 15 is of a type which conveniently serves as a hand grip for the handle and has its operating lever 15ª positioned so that when the handle is gripped tightly by the hand the valve is opened, and on loosening the grip on the handle the valve automatically closes itself. The outer end of the tool 10 as above stated is also internally screw threaded to receive an extension tube 17 which is used when it is desired to inject the air or other fluid deeper into the soil than the tapered member 10 itself will reach.

This tool finds its greatest use in aerating and loosening the soil about the roots of trees and where it is desirable not to break up the surface thereabout. Usually the top soil is too hard to pierce with the tool itself so a hole is made to the desired depth with an air drill or other tool, and the aeration tool then inserted therein. The tool used to make the hole should not be greater in diameter than the diameter of the tapered tube 10 one third the way up from its smaller end so that when the same is jammed into the hole it will seal itself and the friction between the earth and the tapered tube will prevent it from being blown out when the air valve 15 is opened. The gradual or slight tapering of the tube 10 enables the seal to be maintained, as the operative area which is exposed to the pressure of the air within the hole is so small as to enable the tool to be retained in such hole by friction notwithstanding the fact that the air pressure within the hole is high.

This tool also finds use in fracturing soils in cultivating the same prior to the planting of vegetation therein as well as in the loosening up of soil to facilitate its removal in excavating, etc.

Having thus described my invention, what I claim is:—

1. A self tamping aeration tool comprising a relatively long gradually tapered tube adapted to be inserted in a preformed hole in the soil and to seal with its upper portion the upper portion of such hole and internally threaded at each end, a T-shaped handle threaded to the larger end of said tube and provided with a duct extending from one end thereof to the point of connection of the handle with said tube, and a valve on the end of said handle which is provided with said conduit and adapted to be connected to a supply of compressed air, and an extension tube threaded into the smaller end of said tapered tube.

2. A self tamping aeration tool, comprising a long slender gradually tapered tube adapted to be inserted in a preformed hole in the soil and to seal with its upper portion the upper portion of such hole and threaded at its larger end, a T-shaped handle threaded to the larger end of said tube and provided with a duct extending from one end thereof to the point of connection of the handle with said tube, and a valve on the end of said handle which is provided with said conduit and adapted to be connected with a source of compressed air.

3. A self tamping aeration tool comprising a long gradually tapered tube adapted to be inserted in a preformed hole in the soil and to seal with its upper portion the upper portion of such hole, a hollow handle connected to the larger end of said tube, and a valve in said handle adapted to be connected with a suitable source of compressed air.

4. A self tamping aeration tool comprising a relatively long externally gradually tapered tube adapted to be inserted in a preformed hole in the soil and to seal with its upper portion the upper portion of said hole, a T-shaped handle secured to the larger end of the tube and having a conduit extending from one end thereof to and communicating with the upper end of said tube, a valve in the branch of the handle which is provided with said conduit and adapted to be opened by the hand in gripping the handle, the said valve having a connection whereby it may be attached to a suitable supply of compressed air.

In testimony whereof, I hereunto affix my signature.

CHARLES F. IRISH.